(12) United States Patent
Clark et al.

(10) Patent No.: US 11,111,952 B2
(45) Date of Patent: Sep. 7, 2021

(54) CONFIGURABLE BALL MOUNT SYSTEM

(71) Applicants: David Clark, Clark, CO (US); Nathan Kanner, Denver, CO (US); Aaron David Sheppard, Arvada, CO (US)

(72) Inventors: David Clark, Clark, CO (US); Nathan Kanner, Denver, CO (US); Aaron David Sheppard, Arvada, CO (US)

(73) Assignee: New Ideas Manufacturing LLC, Englewood, CO (US)

(*) Notice: Subject to any disclaimer, the term of this patent is extended or adjusted under 35 U.S.C. 154(b) by 24 days.

(21) Appl. No.: 16/688,664

(22) Filed: Nov. 19, 2019

(65) Prior Publication Data
US 2021/0148399 A1    May 20, 2021

(51) Int. Cl.
*F16C 11/06*    (2006.01)
*G03B 17/56*    (2021.01)
*F16M 11/14*    (2006.01)

(52) U.S. Cl.
CPC ......... *F16C 11/0695* (2013.01); *F16M 11/14* (2013.01); *G03B 17/561* (2013.01)

(58) Field of Classification Search
USPC ...................................................... 396/428
See application file for complete search history.

(56) References Cited

U.S. PATENT DOCUMENTS

| | | | | |
|---|---|---|---|---|
| 686,872 | A * | 11/1901 | Whetham | F16M 11/34 248/169 |
| 696,167 | A * | 3/1902 | Forester | F16M 11/14 248/181.2 |
| 1,780,383 | A * | 11/1930 | Green, I | F16M 11/242 248/181.2 |
| 2,180,214 | A * | 11/1939 | Rapp | F16M 11/2014 248/181.1 |
| 2,464,500 | A * | 3/1949 | Graham | F16M 11/10 248/181.1 |
| 4,016,583 | A * | 4/1977 | Yeates | F16M 11/14 396/420 |
| 4,740,804 | A * | 4/1988 | Shands | G03B 15/03 248/182.1 |
| 4,974,802 | A * | 12/1990 | Hendren | F16C 11/106 248/181.1 |
| 5,567,939 | A * | 10/1996 | Hong | F16M 11/14 250/338.1 |
| 7,163,181 | B2 * | 1/2007 | Omps | F16C 11/0619 248/181.1 |
| 7,281,693 | B2 * | 10/2007 | Chou | F16M 11/14 248/179.1 |
| 7,621,492 | B2 * | 11/2009 | Omps | F16C 11/0619 248/181.1 |

(Continued)

*Primary Examiner* — Rodney E Fuller
(74) *Attorney, Agent, or Firm* — Christopher Pilling; Johan Eide; My Patent Guys (57) ABSTRACT

A configurable ball mount system that allows the user to use different spherical structure sizes and removable stem inserts to accommodate various articles being secured by the configurable ball mount system. The configurable ball mount system comprises a spherical structure having a first aperture designed to receive a removable stem insert having different attachment members and adapters. Custom configuration allows the user to interface with multiple articles of more than one manufacturer or brand.

9 Claims, 9 Drawing Sheets

(56) References Cited

U.S. PATENT DOCUMENTS

2007/0114346 A1* 5/2007 Omps ................ F16C 11/0619
  248/181.1
2007/0152116 A1* 7/2007 Madsen ................ F16M 11/14
  248/181.1
2012/0294672 A1* 11/2012 Hicks .................... F16M 11/04
  403/299

* cited by examiner

CONFIGURABLE BALL MOUNT SYSTEM

BACKGROUND

1. Field of the Invention

The present invention relates to a configurable ball mount system for configurable mounting of articles to a spherical structure.

2. Description of Related Art

Commercially available ball mounting systems are commonly produced to match a specific shape or size of a brand's proprietary adapter, mount, or equipment. The diameter of a ball mount compared between different commercial brands is often varying and incompatible across brands. Secondly, the diameter of the ball mount may not be suitable for camera articles or other articles of heavier weights adjoined to the same ball mount. The heavier the weight of the article the larger moment induced upon the centroid of the ball mount, thereby limiting a user in regard to the weight of a camera article they can secure to the ball mount.

Secondly, the user is also commonly limited to a single ball mounting system having a mount or adapter shape that only matches a specific manufacturer's adapter size or a brand's line of products. Therefore, a user is commonly left with only the option of re-purchasing new equipment for mounting different articles of separate industries to the same ball mounting system. For example, a ball mounting system optimized for use with a professional video camera may not interface with a dovetail mount of a firearm. Even though the ball mounting system or supporting tripod is suitable for both uses, the user is confined to the fixed adapter design or a fixed ball mount diameter size, limited the compatibility of the ball mounting system.

Consequently, there is a need for a ball mount system that adapts to different ball mounts sizes for use with different articles of different sizes and weights being secured by the same ball mount system. A ball mount system is also needed that allows the user to interchange adapter sizes to interface with multiple articles of more than one manufacturer or brand.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a particular object of the present invention to provide a configurable ball mount system that allows the user to use different ball mounts and adapters with varying sizes and weights upon the same ball mount system. The configurable ball mount system comprises various embodiments of a removable stem insert allowing the user to interface with multiple articles of more than one manufacturer or brand.

In order to do so, a configurable ball mount system is provided having a spherical structure. The spherical structure further having a first external surface. During configuration of the configurable ball mount system, a removable stem insert having a proximal end and a distal end is adjoined to the spherical structure. To receive the removable stem insert, a first aperture extends into the spherical structure. The removable stem is assembled into the first aperture and a distal end portion of the removable stem insert is left extending above the external surface of the spherical structure. A top interfacing surface positioned upon the distal end of the removable stem insert is designed for interfacing with a variety of mounts and articles. The top interfacing surface, in different embodiments, comprises one or more attachment members or adapters for custom configurations by the user to secure article of a plurality of different manufacturers.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
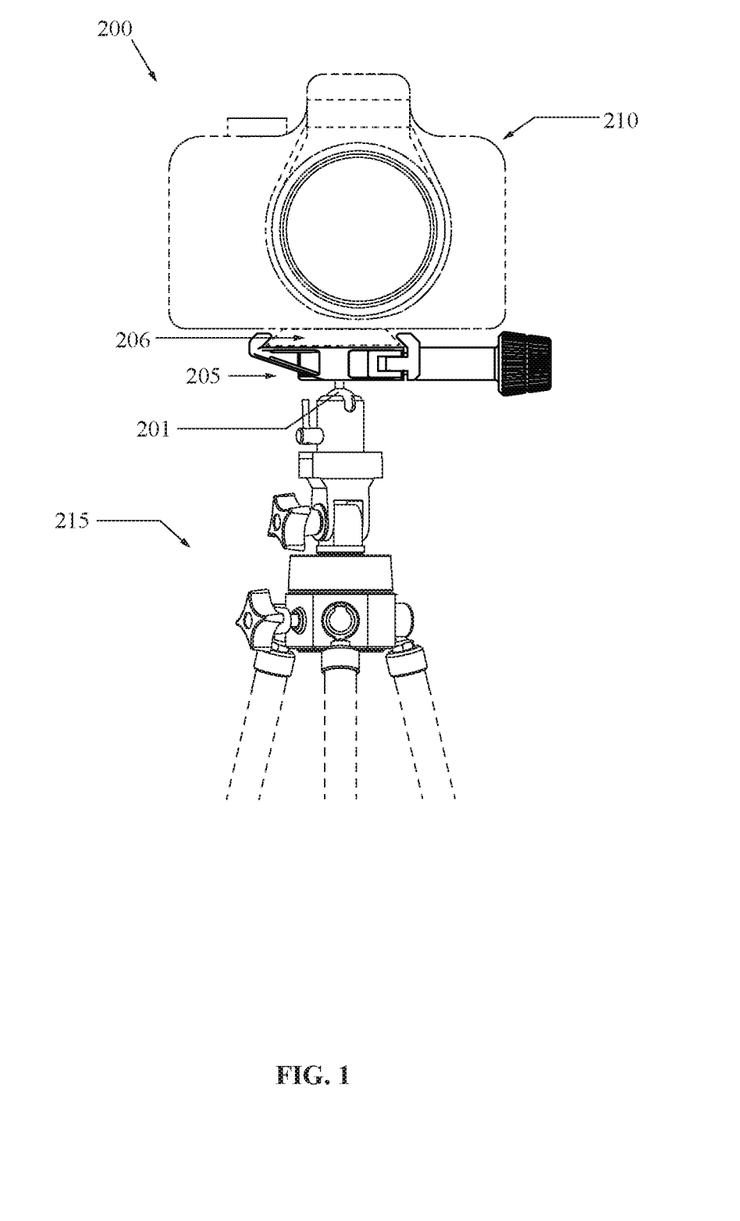
FIG. 1 shows an exemplary front view of one embodiment of the configurable ball mount system joined to an exemplary tripod and an exemplary camera article.

Referring now to FIG. 1, a configurable ball mount system 200 is shown. The configurable ball mount system allowing a user custom configuration to match articles of different sizes and manufacturers. The configurable ball mount system 200 is centered around a spherical structure 201 allowing a user to articulate a mount 205 and/or a camera article 210 about a tripod member 215. It should be appreciated by those skilled in the art that the conception and the disclosed specific methods and structures may be readily utilized as a basis for modifying, securing, or designing other structures outside of the camera industry articles shown in FIG. 1 for carrying out the same purposes of the present disclosure. It should be realized by those skilled in the art that such equivalent structures outside the camera industry do not depart from the spirit and scope of the invention as set forth in the appended claims. For example, the present invention may be used with different sporting equipment, without limitation, such as optics, firearms, or lighting systems.

Figure 2:
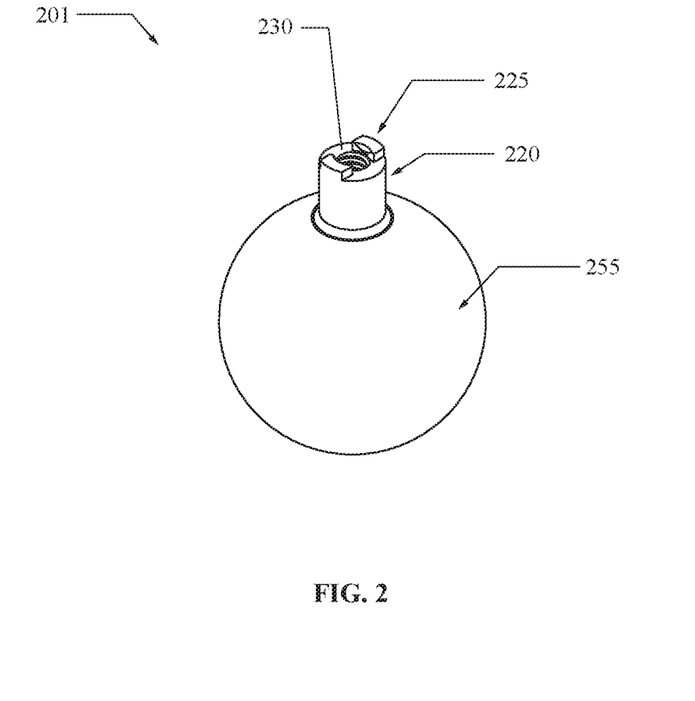
FIG. 2 shows an exemplary perspective view of one embodiment of the configurable ball mount system.
Figure 3:
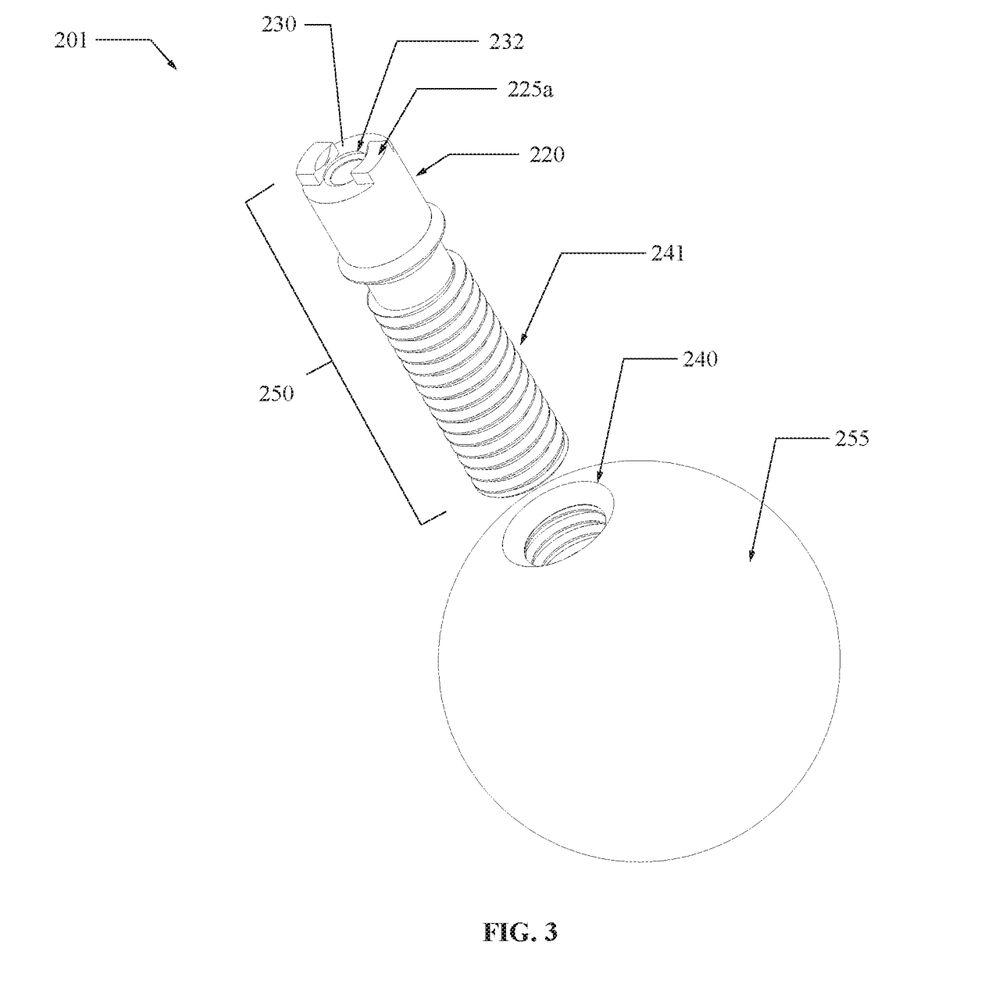
FIG. 3 shows an exemplary exploded perspective view of one embodiment of the configurable ball mount system.
Figure 4:
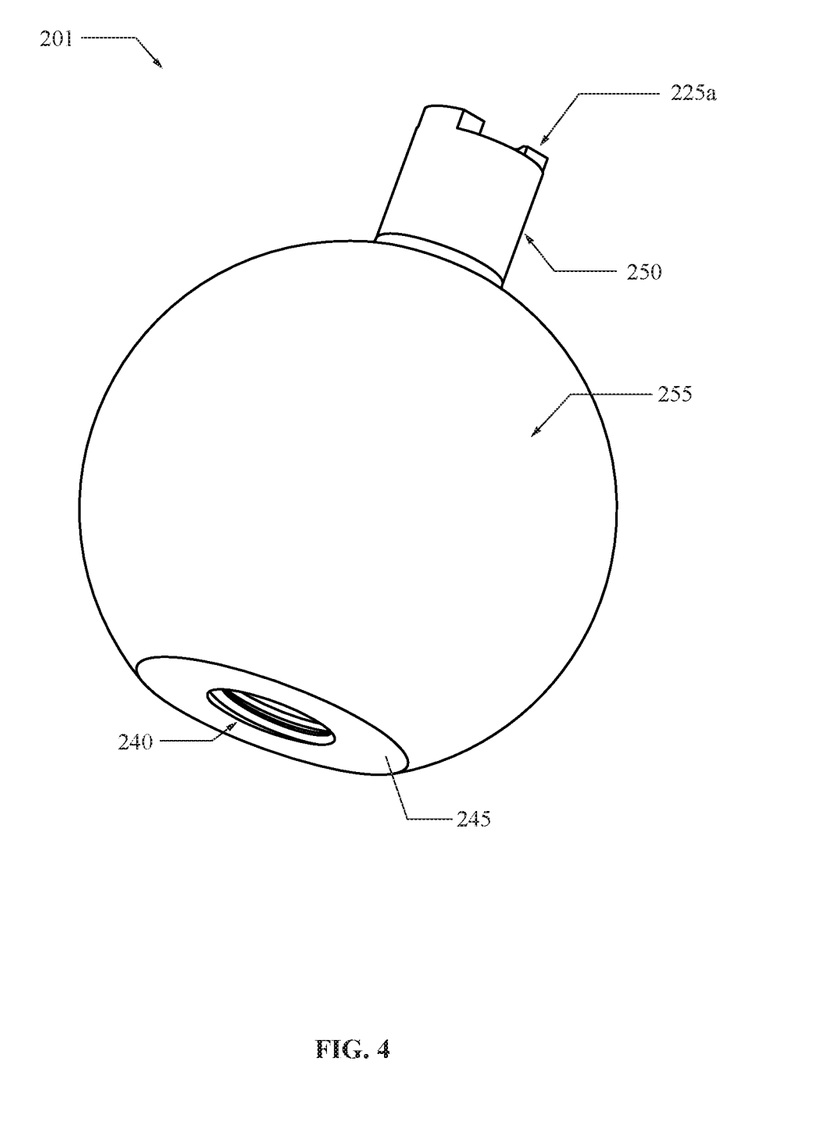
FIG. 4 shows an exemplary perspective view of one embodiment of the configurable ball mount system.
Figure 5:
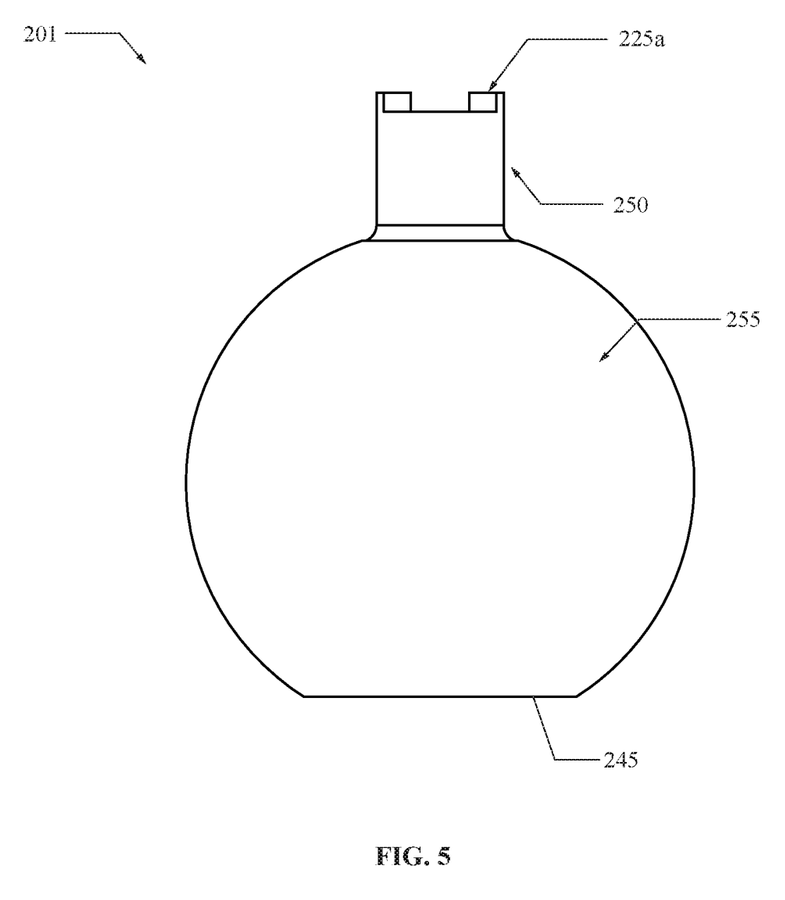
FIG. 5 shows an exemplary front view of one embodiment of the configurable ball mount system.
Figure 6:
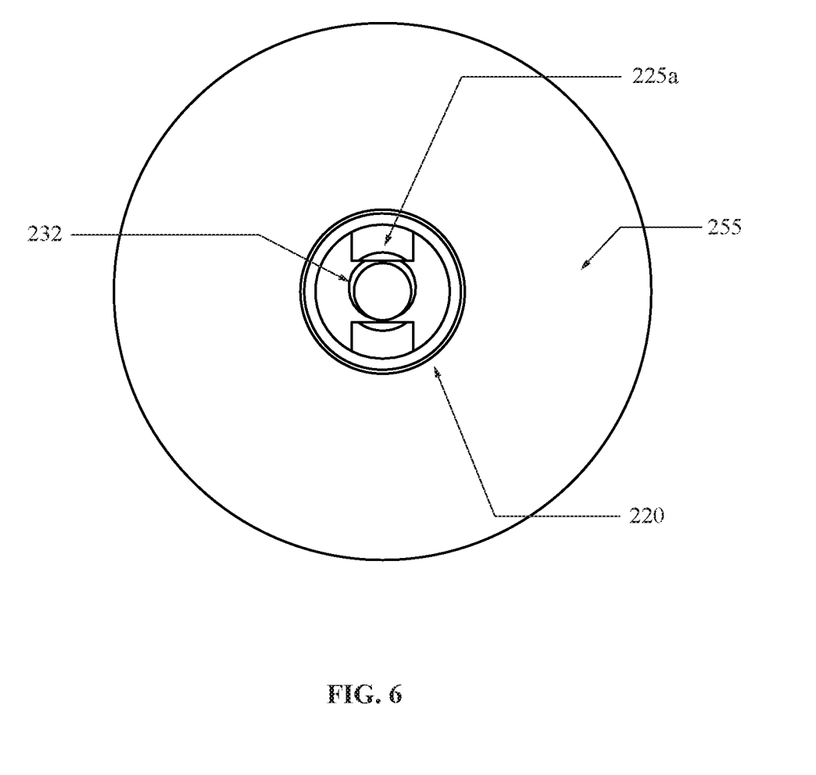
FIG. 6 shows an exemplary top view of one embodiment of the configurable ball mount system.
Figure 7:
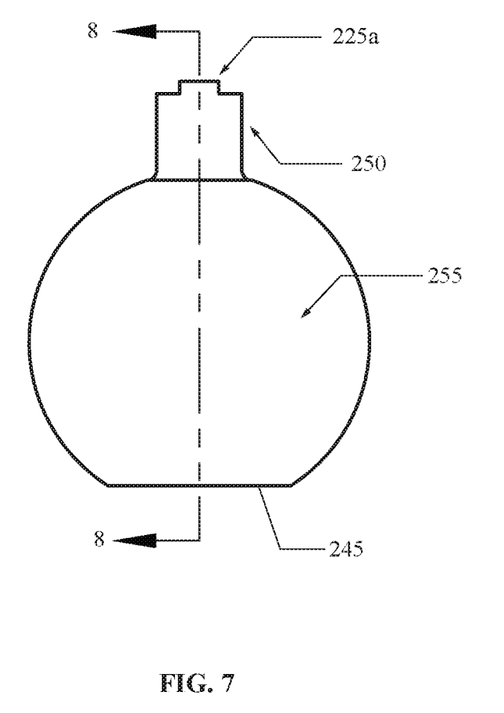
FIG. 7 shows an exemplary side view of one embodiment of the configurable ball mount system and parting line 8-8.
Figure 8:
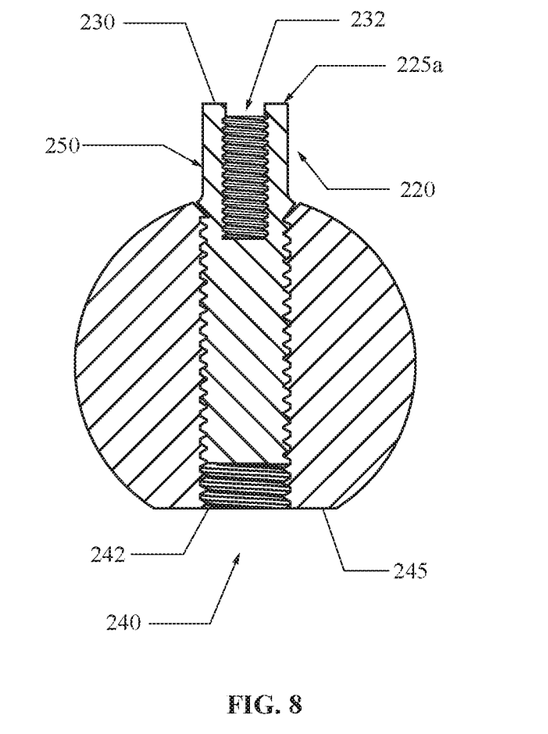
FIG. 8 shows an exemplary cross-sectional view of one embodiment of the configurable ball mount system, taken along parting line 8-8 of FIG. 7.
Figure 9:
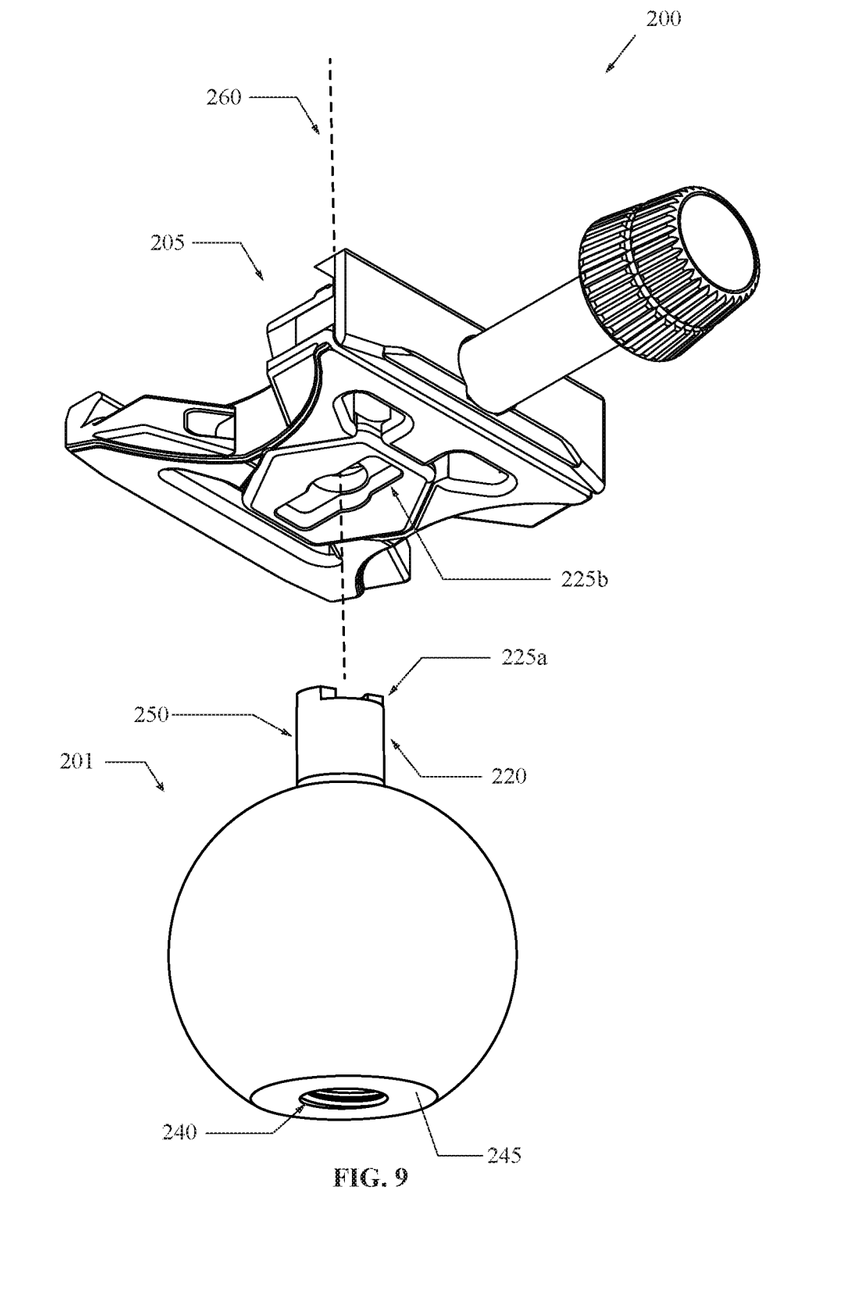
FIG. 9 shows an exemplary exploded perspective view of one embodiment of the configurable ball mount system and an exemplary camera article.

Referring now to FIGS. 2-4, in one embodiment, the configurable ball mount system 200 is comprised of the spherical structure 201 having a first external surface 255 including a first aperture 240 extending inward within the spherical structure 201. In the present embodiment, the first aperture 240 extends in a first direction 260 (as shown in FIG. 9) substantially normal to the first external surface 255. Next during assembly, a removable stem insert 250 having a proximal end and a distal end is configured to interface with the first aperture 240. The distal end section 220 of the removable stem insert is designed to protrude above the first external surface 255 when fully assembled. The distal end section 220 is configured to distance the mount 205 from the spherical structure 201 for free rotation during movement of the camera article 210 during operation. In some embodiments, the distal end section 220 further comprises a top interfacing surface 230 aligned about a plane substantially perpendicular to the first direction 260 of the first aperture 240. In other embodiments, the top interfacing surface 230 may be curved, concave, or convex to match the size and shape of various articles being adjoin thereto.

Still referring to FIGS. 2-4, the removable stem insert 250 further comprises a second external surface 241. In the current exemplary embodiment, the second external surface 241 of the removable stem insert 250 is configured to engage and interface with the internal surface 242 of the first aperture 240. As shown in FIG. 3, the removable stem is rotationally engaged to thread into the first aperture 240 during assembly by the user. When different attachment members 232 or adapters 225 are required for securing different sizes, types or brands of articles, the removable stem insert 250 presently assembled within the spherical structure 201 may be removed and another removable stem insert 250 adjoined as desired. In further embodiments, the internal surface 242 and/or the second external surface 241 further comprises one or more attachment members. In some embodiments, the attachment member 232 may comprise at least one member of an attachment set consisting of: a magnet, a clip, a heat-shrink material flange, a press-fit, a chemical weld, a slide-fit, a clamp, a spring, a fastener, an elastic member, a threaded opening and an adhesive. For example, the removable stem insert 250 and the first aperture 240 may comprise a bayonet adapter system at the attachment member 232, wherein the user inserts the removable stem insert 250 at a predetermined orientation and secures the removable stem insert 250 within the spherical structure 201 by rotation once fully inserted.

It should be understood, that the treaded engagement of the internal surface 242 and the second external surface 241 may vary in depth, diameter, length, etc. In most embodiments, the spherical structure is made from a lightweight material, and the removable stem insert is made from a stiff, hard material configured to increase the overall rigidity of the ball mounting system. This arrangement of materials also helps to provide vibration dampening during use. Further, in some embodiments, dampening materials (not shown), such as rubber pads or foam may be added to the second extremal surface or core of the spherical structure to increase the vibration dampening performance during use. Advantageously, the arrangement and construction of materials described above allow for weight reduction in the overall ball mounting system without comprising the rigidity of the tripod system. During use, in the art of photography, the system must stay rigid and dampen vibration to retain clarity during photography shoots, especially in adverse environmental conditions when long exposures are required. Also, as traveling and carrying equipment is necessary, light weight components are ideal. The spherical structure may be hollow, solid, or a combination thereof.

As shown in FIGS. 5-8, the top interfacing surface 230 of the removable stem insert 250 may further comprise an attachment member 232 and/or an adapter 225. The attachment member 232 aiding in adjoining the configurable ball mount system 200 to the mount 205 and/or the camera article 210. In embodiments having one or more adapters 225 positioned upon the top interfacing surface 230, the one or more adapters aid in the correct orientation during assembly. In embodiments of the configurable ball mount system 200 having the attachment member 232, the attachment member 232 may be chosen from at least one member of an attachment set consisting of: a magnet, a clip, a heat-shrink material flange, a press-fit, a chemical weld, a slide-fit, a clamp, a spring, a fastener, an elastic member, a threaded opening and an adhesive.

As shown in FIG. 9, the adapter 225 is configured to substantially match and conform to a portion of a commercially available camera article 210. The adapter 225 further comprising a male adapter portion 225a and a female adapter portion 225b configured to substantially align and match during assembly. In other embodiments, the adapter 225 is interchangeable with additional adapters, wherein each adapter 225 is configured to receive a camera article 210 of a number of different manufacturers, such that the configurable ball mount system 200 may be used with the number of different manufacturers.

As further illustrated in FIG. 9, the mount 205 and/or the adapter 225 has a connection pattern configured to match commercially available camera mounts. By way of non-limiting example, the commercially available camera mounts 205 and/or articles 210 may be articles made by LVG®, Really Right Stuff and Benro®, Manfrotto®, and the like. The various embodiments of the removable stem insert 250 are configured to be easily swapped out when needed for use with the different brands. It should be understood that other adapters having additional connection patterns configured to match with connection patterns of additional brands may be provided without departing from the scope and spirit of the invention.

In further description of removable stem insert 250, in some embodiments the removable stem insert 250 includes both the top interfacing surface 230 and a bottom interfacing surface 245. The bottom interfacing surface 245 of the removable stem insert 250 is designed to be in proximity to the tripod member 215, such as a commercially available tripod or camera equipment in which the spherical structure 201 of the configurable ball mount system 200 is being adjoined to. The top interfacing surface 230 is configured to substantially match the mount 205 and/or a mounting plate 206 of a commercially available camera, tripod, or camera equipment, as shown in FIG. 1. Common mounting plates typically comprise a square or rectangular member with biasing member adjoined to the perimeter edge of the mounting plate 206, such as an angled edge or dovetail mount. Exemplary mounting plates may further comprise quick-releases, fasteners, threaded ports, slots, linear guide systems, textured surfaced, clamps, and other assessor members. In some embodiments, the top interfacing surface 230 may further comprise the attachment member 232 embodied as a threaded aperture designed to receive a fastener that is first passed through the mount 205 and/or the mounting plate 206. Next the fastener is tightened to temporarily secure the mount 205 and/or the mounting plate 206 to the removable stem insert 250 of the configurable ball mount system 200.

In some embodiments, the removable stem insert 250 may further comprise biasing members being at least one a member of a connection set consisting of: a slot, a rail, a joint, a magnet, an elastic member, a snap-fit, a clamp, a clip, and a fastener. In other embodiments, the rail and the joint of the connection set are chosen from, by way of non-limiting example, a rail set consisting of: a dovetail rail, a tongue and groove joint, a linear guide rail, a dado joint, and a dovetail joint.

In some embodiments, it may be desirable that the configurable ball mount system 200 further comprises at least one member of an identification set consisting of: an alphanumeric identification, the user's name, a symbolic shape, a company brand, a numeric identification number, a QR code, a barcode, an RFID tag, or any combination thereof. For example, the first external surface 255 may further comprise a numeric identification number that conveys the diameter of the spherical structure 201. In some embodiments, the first external surface 255 of the spherical structure 201, the internal surface 242 of the first protrusion and/or the second external surface 241 of the removable stem insert 250 can further comprise an external texture. The external texture further comprises at least one member of a texture set consisting of: indentations, extrusions, knurling, a rough surface, and bumps.

In reference to FIGS. 1 through 9, the present invention may include the following elements:
a configurable ball mount system 200
a spherical structure 201
a mount 205
a mounting plate 206
a camera article 210
a tripod member 215
a distal end section 220
an adapter 225
a male adapter portion 225a
a female adapter portion 225b
a top interfacing surface 230
an attachment member 232
a first aperture 240
a second external surface 241
an internal surface 242
a bottom interfacing surface 245
a removable stem insert 250
a first external surface 255
a first direction 260

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A configurable ball mount system comprising:
a spherical structure having a first external surface;
a removable stem insert having a proximal end, a distal end, and a second external surface;
a first aperture having an internal surface and extending into the spherical structure, wherein the internal surface engages with the second external surface of the removable stem insert; and
a top interfacing surface positioned upon the distal end of the removable stem insert and having two opposing protrusions, wherein the top interfacing surface is configured to engage with a mount for tripod equipment configured to hold camera, sporting, or recreational equipment.

2. The system of claim 1, wherein the spherical structure is constructed from a lightweight material and the removable stem is constructed from a hard, rigid material.

3. The system of claim 2, wherein the adapter is configured to substantially match and conform to a portion of a commercially available camera article.

4. The system of claim 2, wherein the adapter is interchangeable with additional adapters, wherein each adapter is configured to receive a camera article of a number of different manufacturers, such that the configurable ball mount system may be used with the number of different manufacturers.

5. The system of claim 1, wherein the top interfacing surface further comprises an attachment member and/or an adapter.

6. The system of claim 1, wherein the second external surface of the removable stem insert and the internal surface of the first aperture are threaded to interface during assembly.

7. The system of claim 1, wherein the internal surface and/or the second external surface further comprises an attachment member.

8. The system of claim 1, wherein the first external surface further comprises a bottom interfacing surface positioned substantially normal to the first aperture.

9. The system of claim 1, wherein the first aperture extends through the spherical structure.

\* \* \* \* \*